Aug. 12, 1969 M. C. CLERC 3,461,391

ELECTRONIC SIGNAL AMPLITUDE LIMITER

Filed Aug. 2, 1965

MILTON C. CLERC
INVENTOR.

BY James J. O'Reilly
AGENT

United States Patent Office 3,461,391
Patented Aug. 12, 1969

3,461,391
ELECTRONIC SIGNAL AMPLITUDE LIMITER
Milton C. Clerc, Worthington, Ohio, assignor to Industrial Nucleonics Corporation, a corporation of Ohio
Filed Aug. 2, 1965, Ser. No. 476,523
Int. Cl. H03k 5/08
U.S. Cl. 328—171 5 Claims

ABSTRACT OF THE DISCLOSURE

A dual frequency impedance measuring gauge includes a variable gain limiter that substantially reduces a signal amplitude derived therefrom when high amplitude noise pulses are generated by the measuring gauge. In accordance with one embodiment, the limiter includes an operational amplifier with a capacitive feedback path shunted by a voltage responsive neon tube. In a second embodiment, the limiter comprises a neon tube in series with an impedance and the gauge output signal. The limiter output is applied to a different detector channel for each frequency. The outputs of the channels are combined and fed to a utilization device via a normally closed photoresistor switch that is opened only in response to the limiter output exceeding a predetermined amplitude. The activation period of the switch occurs at a time related to the response time of one of the channels.

This invention relates generally to signal amplitude limiters and more particularly to noise elimination circuitry for measuring and recording systems.

Most measuring systems for industrial applications amplify a low level signal generated by a transducer of one form or another. Generally, a high gain amplifier receives the output signal of the transducer and drives an indicator such as a chart recorder. Alternatively, the amplified signal may be used to control the process being measured.

These systems are susceptible to noise usually in the form of high amplitude, short duration pulses. The input stages of these systems are normally designed to handle small signals. Large amplitude noise signals either damage sensitive components located in the low level stages or cause nonlinear operation due to saturation of one or more amplifiers. If the noise amplitudes are within the design capability of the measuring system, the noise will be presented to the recorder. Depending on the relative amplitude of the noise, the recorder will either graphically present the noise along with the process information, thereby confusing the latter, or produce instability that may be reflected as an error in the recorded information.

BACKGROUND

In the past, vacuum and semiconductor diodes have been utilized to shunt excessive amplitude electrical signals to ground potential. These devices cannot be used as signal limiters in high impedance circuitry such as the high gain amplifiers mentioned above. Sometimes voltage-limiting or diode action is used in a feedback path around a high gain amplifier to provide for nonlinear transformation between the input and output signals of the circuit. Here again the diode feedback path is connected to the high impedance input terminal of the amplifier and loading may result. Both the D.C. resistance and the A.C. impedance of these prior art signal limiting devices is quite low. The low A.C. impedance arises from the large (several picofarads) value of their interelectrode capacitance.

The problem may be particularly acute when feedback limiting is applied to an operational amplifier having one or more capacitive feedback loops. If conventional limiting diodes of the vacuum or semiconductor type are used in parallel with these feedback paths, the total capacitance between the input and output terminals of the amplifier may be excessive. This is especially true when the diode capacitance is greater than, say, one-tenth of the smallest feedback capacitance. In the parallel circuit construction, the capacitance of the limiter adds to the normal feedback capacitance and the combined capacitance may significantly affect the output signal of the amplifier.

BRIEF DESCRIPTION OF THE PRESENT INVENTION

In accordance with one embodiment of my invention, I provide an electrical signal limiter for high impedance electronic apparatus. My limiter comprises a discharge device having two electrodes immersed in a gas that breaks down or ionizes whenever the voltage across the electrodes attains a predetermined value. The electrodes are connected in series with a current-limiting electrical impedance. The entire series circuit is connected across the potential to be limited and the output is taken across the dual electrodes of the discharge device.

In a specific embodiment, the limiter comprises a neon lamp circuit connected between the output of an amplifier and the input thereof. The circuit includes a high-pass filter in series with a D.C. blocking capacitor. The filter couples the amplified fast-rising noise pulse from the amplifier output to the neon which breaks down and conducts. The noise pulse reversed in phase is returned to the input of the amplifier by the neon to reduce the originating input noise pulse.

My circuit has particular advantage in the measuring system described and claimed in a copending application Ser. No. 181,341, now abandoned filed Mar. 21, 1962, by F. Maltby et al. and assigned to the assignee of the present application. Briefly, the system may be described as a dual frequency moisture gauge wherein the varying capacitance of a material-contacting probe is measured. Signals at two different frequencies are amplified by a high-gain amplifier. The output of the amplifier is applied to a first and a second measuring channel each including a bandpass filter and a demodulator. The filters are cut for the respective measuring frequencies. The outputs of the demodulators are then combined to obtain the difference between the channel outputs.

In this system, a small feedback capacitance is used around the common amplifier to form part of a probe capacitance measuring bridge. Noise pulses generated in the probe tend to saturate the high gain amplifier even if they are only in the millivolt range. My novel feedback limiter can be connected around the amplifier to provide its unique noise feedback function without significantly increasing the value of said feedback capacitance in parallel with which it is placed. Since the electrodes of my gas discharge device can be placed some distance apart and still provide the potential limiting function of a conventional diode due to the presence of the ionizable gas, the interelectrode capacitance usually is less than 0.1 picofarads.

In addition, I provide a squelch circuit that removes noise from the system at some later stage such as the servo recorder. I monitor the output voltage of the common amplifier and generate a recorder disable signal whenever the amplifier output voltage exceeds a certain amplitude. Since a pulse disturbance lingers longer in the lower frequency measurement channel, I provide means for delaying the recorder enabling for a period of time roughly equivalent to the response time of this channel. Specifically, I connect a photoswitch comprising a photoresistive element in the path of the difference signal to the recorder and use an isolated transistor amplifier coupled to the output of the common amplifier to energize a lamp mounted adjacent to the photoresistor. This squelching circuit is very effective in eliminating the "jitter" and improving the recovery of a servo type recording instrument.

OBJECTS OF THE PRESENT INVENTION

Accordingly, it is a primary object of my invention to provide a signal amplitude limiter for use with high impedance electronic circuitry.

It is another object of my invention to provide a signal limiter that is inexpensive to construct.

It is still another object of my invention to provide a signal amplitude limiter that provides an extremely low output capacitance.

It is also an object of my invention to provide a novel squelch system for a dual frequency measuring and recording system.

BASIC LIMITER CONSTRUCTION AND OPERATION

Figure 1:
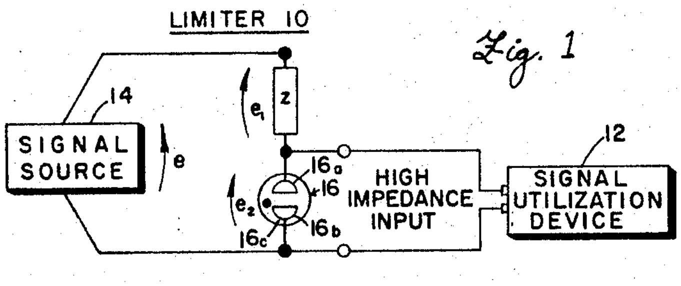
FIG. 1 is a diagrammatic view of my novel limiter circuit.

With reference now to the drawings and especially to FIG. 1, one embodiment of my invention comprises a limiter circuit 10 for regulating the potential applied to the signal utilization device 12 by a signal source 14. The signal utilization device 12 may be a high gain amplifier string or other device having a high impedance input. Signal source 14 may be a transducer developing a potential $e$ varying in accordance with some physical property of a material against which it is positioned.

To insure that the potential across the input terminals of the signal utilization device 12 never exceeds a predetermined amplitude, I provide an electrical discharge device 16 having a pair of spaced electrodes 16*a* and 16*b*. The electrodes 16*a* and 16*b* are housed in a gas-filled bulb 16*c*. The filling gas may be neon, argon or other vapor that becomes ionized and breaks down under a sufficiently high electrical field. Since the electrodes can be spaced fairly widely apart, the interelectrode capacitance of this device approaches a value of 0.1 picofarad. Vacuum or semi-conductor diodes, commonly used as voltage limiters, may exhibit an interelectrode capacitance from 10–20 picofarads. The breakdown voltage of the filling gas will depend on the type of gas, the pressure used to fill the envelope 16*c*, and the electrode spacing.

A current limiting impedance Z is connected in series with the electrodes 16*a* and 16*b*. Of the potential $e$ developed by the signal 14, $e_1$ appears across the impedance Z and $e_2$ appears across the discharge device 16.

In the operation of this circuit, the discharge device 16 is normally nonconducting when the signal $e$ to be limited is small. As a result, the potential $e$ appears at the input terminals of the signal utilization device 12; should the magnitude of $e$ increase sufficiently to break down the filling gas of the discharge device 16, the input potential $e_2$ is limited to a substantially constant value sufficient to maintain the device 16 in conduction. In reality, the discharge device 16 can be maintained in conduction by a voltage somewhat less than the firing voltage.

One advantage of this circuit is its low output shunting capacitance that will not affect the operation of the signal utilization device 12 on low level signals on which limiting is not required. This also permits rapid transition of the limiter into and out of its "on" condition. Particular application may be found in signalling systems wherein high speed pulse trains of varying amplitude must be decoded by one or more limiter or discriminator circuits.

DESCRIPTION OF MY FEEDBACK AMPLIFIER LIMITER

Figure 2:
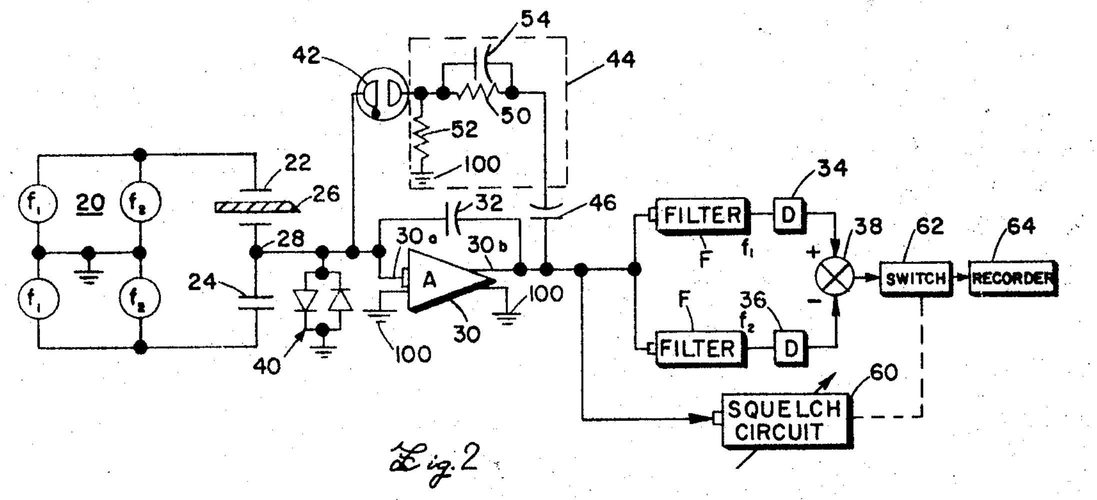
FIG. 2 is a schematic circuit diagram, partly diagrammatic, of a dual frequency moisture gauging system embodying the signal limiter shown in FIG. 1.

Referring to FIG. 2, I illustrate one embodiment of a capacitance measuring system incorporating the signal limiter of my invention. What is illustrated and described briefly hereinbelow is a dual frequency material moisture gauging system that is more adequately described in the Maltby et al. application mentioned, supra.

Oscillators 20 generating signals at frequencies $f_1$ and $f_2$ are coupled to a pair of capacitors 22 and 24 in a bridge circuit configuration. Capacitor 22 senses the moisture in a sheet of material 26 and its electrical capacitance varies in accordance therewith. Capacitor 22 may comprise a probe with multiple electrodes riding on the sheet 26. Capacitor 24 is a bridge balancing capacitor. Any variations in bridge balance affect the potential at point 28. In order to keep this point nearly at ground potential, a high gain amplifier 30 is connected to point 28. A feedback capacitor 32 is used to couple the amplifier output voltage back to the junction 28, common to the input terminal 30*a* of amplifier 30, to eliminate any charge that may accumulate. Ground 100 represents the other input and output terminal since they are quite often electrically common.

The output of amplifier 30 is passed through two different measurement channels each comprising a different filter F, one for the signal frequency $f_1$ and one for signal frequency $f_2$. Detectors 34 and 36 rectify the filtered signals to obtain D.C. signals which are subsequently compared by a comparator unit 38. The output of the comparator 38 is indicative of moisture changes in the material 26 being probed by the capacitor 22.

Very often as the material is being measured, static discharges periodically develop and are passed as large amplitude noise spikes that severely upset the measuring system and may damage the input to the amplifier 30 since it normally operates on relatively low level signals.

To clip relatively large spikes of several volts amplitude an input diode circuit 40 may be utilized. While only a single diode is shown for each polarity it is recognized that several diodes can be placed in series to raise the clipping level. While this network eliminates noise pulses in the amplitude range of say 0.5 to 2.0 volts, depending on the number and type of diodes used, noise pulses of smaller amplitude may still saturate the amplifier 30 or cause some undesired nonlinear operation thereof due to their transient nature. For example, if the amplifier 30 has a forward gain of 300 and the output saturates around 100 volts, a 333 millivolt signal is sufficient to cause problems. To handle these lower amplitude noise spikes, I provide a noise feedback loop comprising a neon lamp 42 in series with an attenuator circuit 44 (enclosed in the dashed line rectangle) and, in some cases, a D.C. blocking capacitor 46. The attenuator 44 is a form of high pass filter comprising a voltage divider formed by resistors 50 and 52 and a capacitor 54 in parallel with resistor 50. Attenuator 44 is connected in series with the neon lamp 42 between the output terminal 30*b* and the input terminal 30*a* of amplifier 30.

With this circuit construction, the amplifier 30 functions in a normal manner and moisture-functional signals are amplified and transmitted to the separate detector channels. The only feedback normally occurring is that transmitted iva capacitor 32. The neon lamp 42 is not conducting and its terminal capacitance is negligible. While the blocking capacitance 46 may be several thousand picofarads (pf.), the total capacitance of the series limiter feedback connection will be less than the smallest capacitance, which in this case, is presented by the neon lamp 42 which exhibits less than 0.1 pf. of capacitance.

A noise pulse arriving at the input of amplifier 30 may cause ionization of the neon lamp 42, if it is of sufficient amplitude. For example, with an amplifier gain of 300, if the neon lamp 42 fires when its terminal voltage reaches 90 volts, an input signal in excess of 0.30 volt causes the neon to conduct. The neon lamp 42 conducts and applies a portion of the output voltage of the amplifier 30 back to the input terminal **30*a* tending to cancel out the noise pulse existing there. A potential is applied to the input terminal 30*a* which is equal to the amplifier output voltage less the maintaining voltage for the neon. For example, if the amplifier output suddenly rises to 90 volts, capacitor 54 immediately couples it across resistor 50 to the neon bulb 42. The neon comes on but it may require only 85 volts to sustain it. This leaves the input tending to rise 5 volts above ground. It will never get that high since the input diodes 40** conduct at say one or two volts.

By adjusting one or more of the operating parameters, i.e. the amplifier gain, the attenuation and frequency response characteristics of the attenuator 44 and the number and type of input diodes used at 40, it is possible to substantially eliminate all noise from the system at an early stage without seriously affecting the system's response to desired signals. If process information is contained in the amplitude of the amplified signals, one must be careful not to set the threshold of the feedback limiter so low that valuable process information is lost due to premature clipping of the desired signal. It may, of course, be difficult for the circuit to distinguish noise from process signal when they are both about the same amplitude. The attenuator 44 should help in this regard since the noise usually comes in short duration spikes that are readily coupled directly through the attenuator circuit 44. Slower varying process signal voltages are divided by resistors 50 and 52 and are therefore attenuated to a greater extent and are not so likely to set off the neon lamp 42.

RECORDER NOISE SQUELCH CIRCUIT

In some cases, it may be desirable either to remove the effect of noise at a later stage in the measuring system or to supplement the noise feedback loop with a recorder squelching arrangement such as represented by the block 60 in FIG. 2. The squelch circuit 60 monitors the output potential developed by the amplifier 30 and controls a switch device 62 that couples the moisture-function signal from the comparator 38 to a recorder 64. Switch 62 may be a magnetically-actuated reed switch or the photo-operated type described hereinbelow, for example. In this manner, noise pulses are not presented on the recorder 64 eliminating any jitter of the recording mechanism.

Figure 3:
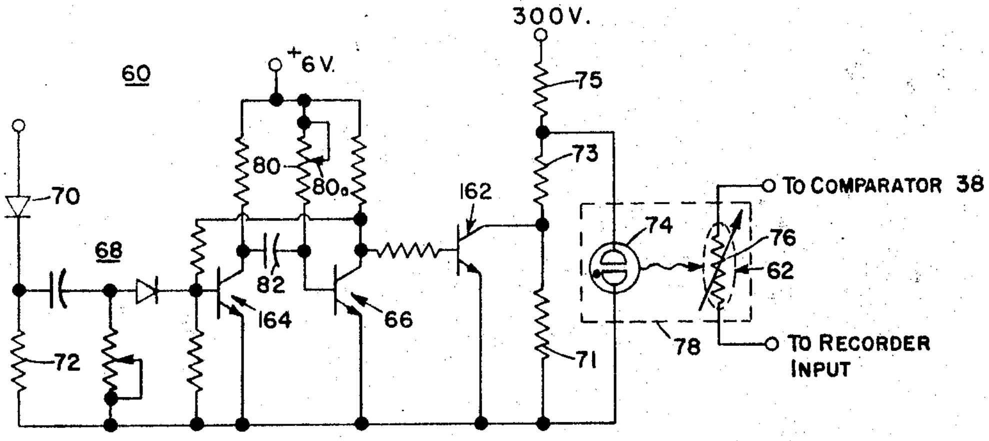
FIG. 3 is a schematic circuit diagram of an alternative signal suppression network useful in the system shown in FIG. 2.

More specifically, with reference to FIG. 3, I provide a squelch circuit 60 that includes an output transistor 162, a pair of driver signal amplifying transistors 164 and 66, and a coupling network 68. A Shockley diode 70 is connected to the output of amplifier 30 to develop a pulse across a load resistor 72 whenever the amplifier output at terminal **30*b* exceeds, say 70 volts or any potential level that is normally attainable only by a noise pulse. This pulse is coupled by circuit 68 to the base of transistor 164, amplified and capacitance coupled to transistor 66. Transistor 66 is directly coupled to the base of output transistor 162 which energizes a light-producing device such as neon bulb 74**.

The switch 62 is a photoswitch device utilizing a photoresistive element 76 whose impedance radically changes when radiated with light. The photoresistive element 76 is connected between the comparator 38 and the recorder 64 and it may be physically enclosed in an ambient light shielding environment indicated by the dotted line 78 along with the neon 74. It is appreciated that the photoswitch may be connected internally in the recorder so long as the marking indicator mechanism thereof is disabled whenever noise is present at the output **30*b* of the amplifier 30. This construction permits complete isolation between the recorder 64** and the squelch amplifiers.

In the normal operation of my squelch circuit, transistor 66 is conducting and transistors 162 and 164 are biased off. A very high potential is applied to the neon 74 and it irradiates the photoresistor 76. The impedance of the photoresistor 76 is very low under this condition and signals from the comparator are coupled directly to the recorder 64. Whenever a noise pulse greater than the 70 volt clipping level of the Shockley diode 70 enters the detector channels, a signal is developed across load resistor 72 which turns transistor 164 on. Transistor 66 is driven into its nonconducting region allowing output transistor 162 to conduct. The potential across the neon 74 drops due to the increased current flow through the voltage divider comprising resistors 71, 73, and 75. Neon 74 is thereby extinguished and the impedance of the photoresistor 76 quickly increases to a very large value, effectively opening up the input to the recorder 64.

Normally, the neon 74 would ignite immediately upon the absence of a noise pulse at the input of the detector channels and the recorder 64 would resume recording. However, since the pulse travels through two frequency selective networks, namely the filters F having quite different transient response, it may "hang over" in the lower frequency channel and be presented on the recorder 64 unless some delay is used in enabling the recorder 64. For this purpose, I have connected a potentiometer 80 in the base return lead of transistor 66 and use a large coupling capacitor 82 between transistors 164 and 66. These two elements primarily affect how long transistor 66 remains off. When a noise pulse expires allowing transistor 164 to cease conduction, the charge on capacitor 82 must be neutralized before transistor 66 comes on. By setting the control arm **80*a* of potentiometer 80**, a delay of several milliseconds can be obtained that is sufficient to permit the last remnants of the noise pulse to die in the low frequency channel.

Summarizing the advantages of my invention, it apparent that the noise elimination techniques I use are particularly useful in a high-speed capacitance measuring system that analyzes material properties at one or more radio frequencies. It is, of course, capable of other applications that will be apparent to those skilled in the art.

Accordingly, many modifications, additions, and substitutions may be made in the preferred embodiments of my invention without departing from the true spirit and scope of the invention or relinquishing any of the advantages attendant thereto, the bounds of my invention being defined by the appended claims.

I claim:

1. A noise pulse eliminator comprising a high gain amplifier system having an input for receiving signal voltages as well as noise voltages having a somewhat higher amplitude and frequency content than said signal voltages, an output providing an amplified input voltage, and a feedback capacitor connected between said input terminal and said output terminal, said noise pulse eliminator comprising:

- a feedback circuit connected including
  - a dual terminal neon lamp having one terminal connected to said amplifier input,
  - a first resistance connected between the other terminal of said neon lamp and said output of said amplifier,
  - a capacitor connected in parallel with said first resistance,
  - means connected to the common junction of said neon lamp and said first resistance for applying a selectable portion of said amplified input voltage to said neon lamp, and
- diode means connected to said amplifier input to prevent said input voltage from rising above a predetermined amplitude whenever said neon lamp conducts.

2. In an impedance measuring system including a capacitance probe and balancing impedance responsive to a pair of A.C. voltages having relatively widely spaced frequencies, whereby large amplitude pulses are derived from said probe only in response to noise pulses generated across the electrodes of the probe, and an output device responsive to the signal derived from said probe at both said frequencies, the improvement comprising: a variable gain voltage limiter responsive to said probe for feeding both said frequencies to said output device, said limiter including a normally cut-off neon tube activated to an ionized state in response to the occurrence of the noise pulses to substantially reduce the limiter gain, said limiter comprising a capacitive feedback loop of a high gain amplifier, said neon tube being connected in shunt with said feedback loop.

3. The system of claim 2 further including diode means connected to an input of the amplifier to prevent voltage applied to the amplifier from exceeding a predetermined amplitude when said neon tube is ionized.

4. The system of claim 3 further including a resistor in series with one electrode of said neon tube and an output terminal of said amplifier, a capacitor shunting said resistor, and means connected to said one electrode for applying a portion of the amplifier output voltage to said one electrode.

5. The system of claim 2 further including a resistor in series with one electrode of said neon tube and an output terminal of said amplifier, a capacitor shunting said resistor, and means connected to said one electrode for applying a portion of the amplifier output voltage to said one electrode.

References Cited

UNITED STATES PATENTS

| | | | |
|---|---|---|---|
| 1,895,774 | 1/1933 | Smets et al. | 330—110 X |
| 2,285,794 | 6/1942 | Barney | 330—110 X |
| 3,041,535 | 6/1962 | Cochran | 330—110 X |
| 3,058,068 | 10/1962 | Hinrichs et al. | 330—110 X |

ARTHUR GAUSS, Primary Examiner

J. D. FREW, Assistant Examiner

U.S. Cl. X.R.

307—229, 230, 233, 235; 328—168, 169, 175